June 4, 1968 W. M. CUMMINGS 3,386,542
ACCELERATOR SET AND RELEASE MECHANISM
Filed March 14, 1966 2 Sheets-Sheet 1
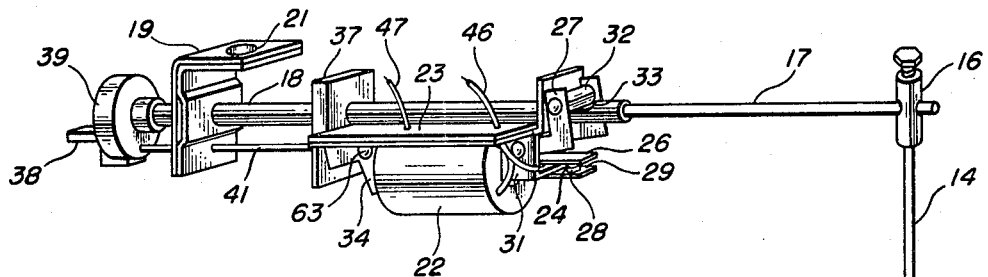
FIG. 1
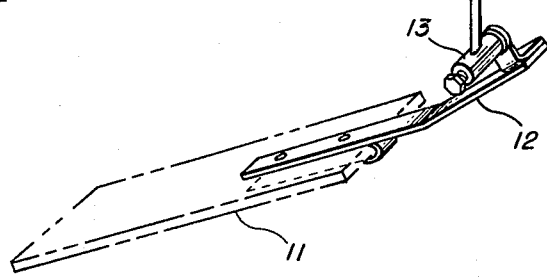
FIG. 2
FIG. 3
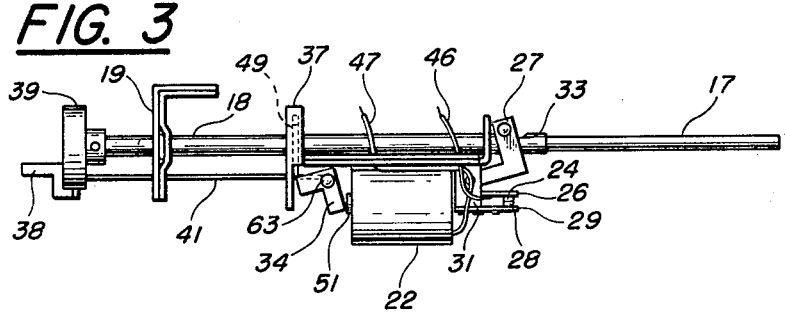
FIG. 5
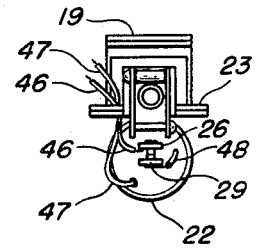
FIG. 4
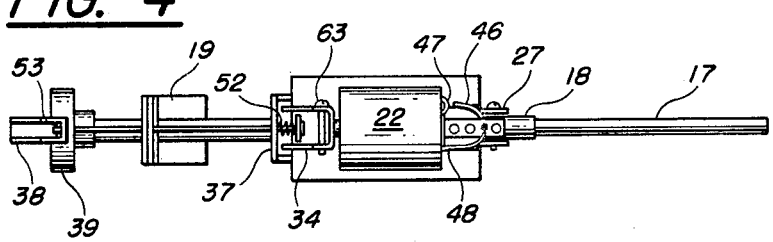
FIG. 6
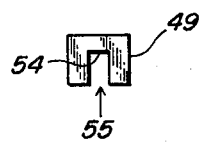
INVENTOR.
WARREN M. CUMMINGS
BY
Richard K. MacNeill

United States Patent Office 3,386,542
Patented June 4, 1968

3,386,542
ACCELERATOR SET AND RELEASE
MECHANISM
Warren M. Cummings, 3807 44th St.,
San Diego, Calif. 92105
Filed Mar. 14, 1966, Ser. No. 534,032
4 Claims. (Cl. 192—3)

ABSTRACT OF THE DISCLOSURE

An accelerator set and release mechanism comprising a rod adjustably attached to a vehicle accelerator, a slip tube frictionally and slidably engaged with a fixture in the automobile dashboard, the rod slidably carried by the slip tube, a one end of the rod being notched which cooperates with a recess and latch mechanism in the slip tube for setting the relative position of the rod and the slip tube and thereby setting the depression of the accelerator pedal. The amount of depression being determined by the position of the slip tube with its fixture on the automobile dashboard; a hand release mechanism attached to the slip tube, a solenoid release mechanism actuated by the brake light switch of the automobile.

---

The present invention relates to an accelerated set and release mechanism for setting the accelerator pedal of an automobile of a vehicle in any desired position.

According to the invention, a linkage is provided having one end attached to a vehicle accelerator pedal and the other end to a rod which is carried by a slip tube. The slip tube is frictionally and slideably engaged with a fixture in the automobile such as the dashboard. The end of the rod which is within the slip tube is notched and cooperates with a latch on the slip tube for latching the rod in a predetermined position with respect to the slip tube when desired. The slip tube being slideably mounted is the variable for setting the amount of depression desired on the accelerator pedal. The slip tube latch can be disengaged by any one of three ways. The first method is solenoid actuated, the solenoid winding itself being actuated through the brake light switch. The second means is by depressing the accelerator pedal manually and releasing it rapidly. This overrides the latch through a built-in latching time delay means. The third method is a hand-operated mechanical linkage which locks out the latching means in the event the operator desires to de-couple the setting mechanism without hitting the brake or the accelerator pedals. In the set position, the mechanism of course does not prevent the operator from further depressing the accelerator pedal in the event he wishes to pass another vehicle for example, and easing up on the pedal to effect resetting in the same position as previously set by the slip tube position. Furthermore, once the mechanism has been set for depressing the accelerator to a specific position, it can be released by any of the above means and re-set to the same position without further adjustment.

An object of the present invention is the provision of an improved accelerator set and release mechanism.

Another object is to provide an accelerator set and release mechanism having a fool proof lock-out means.

A further object of the invention is the provision of an accelerator set and release mechanism which is released by energization of the vehicle brake light.

Still another object is to provide an accelerator set and release mechanism which is released by depressing the accelerator pedal manually and backing off on the accelerator pedal rapidly.

A still further object of the invention is a provision of an accelerator set and release mechanism in which readjustment is not necessary after it is once set.

Another object of the invention is the provision of an accelerator set and release mechanism which is simple and inexpensive to manufacture, easy to install and operate, and requires a minimum of maintenance and adjustment.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a perspective view of the preferred embodiment of the present invention shown attached to an accelerator pedal;

FIG. 2 is a side elevation of the actuating rod of FIG. 1;

FIG. 3 is a side elevation of the embodiment of FIG. 1 shown in the set position;

FIG. 4 is a bottom view of the embodiment of FIG. 3;

FIG. 5 is an end view of the embodiment of FIG. 3;

FIG. 6 is a front elevation of the latch of the present invention;

Figure 7:
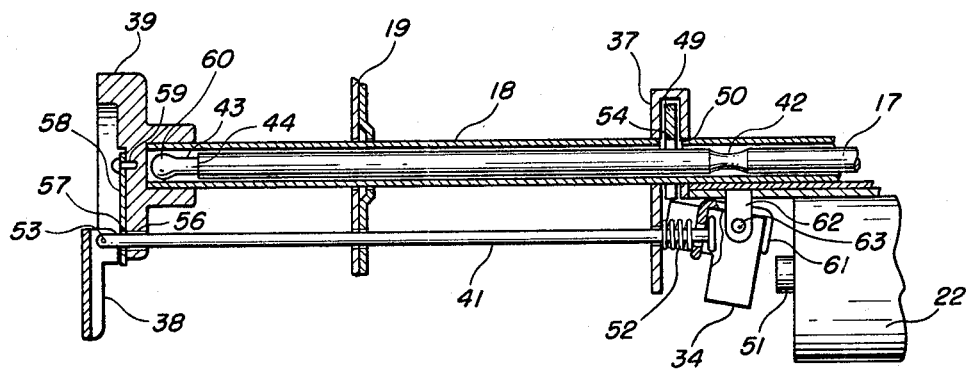
FIG. 7 is a side elevation in section of the invention in its lock-out position.

Referring to FIG. 1, accelerator pedal 11 is attached through mounting bracket 12, adjustable linkage 13, mounting rod 14, and adjustable linkage 16, to actuating rod 17. Actuating rod 17 is slideably carried by slip tube 18. Slip tube 18 is frictionally and slideably carried by mounting bracket 19 which is adapted by mounting hole 21 to be mounted to any fixture of a vehicle such as the bottom of the vehicle dashboard, for example. Solenoid 22 is carried by mounting bracket 23, mounting bracket 23 being fixedly attached to slip tube 18. Electrical contact 24 is mounted on insulator leaf 26 which is attached to mounting bracket 27. Electrical contact 28 is carried by insulator leaf 29 which is fixedly attached to mounting bracket 31. Mounting bracket 27 is rotatably attached at pin 28 to mounting bracket 31. Mounting bracket 27 carries a roller 32 in communication with a recess 33 in slip tube 18. Actuating bracket 34 is rotatably attached by pin 63 to mounting bracket 23. Latch housing 37 is fixedly attached to slip tube 18. Release and lock-out handle 38 is rotatably carried by set handle 39; lock-out handle 38 being rotatable with respect to lock-out linkage 41.

Referring to FIG. 2, actuating rod 17 has contact recess 42 and latching recess 43 having latching shoulder 44.

Referring to FIGS. 3 and 4, actuating rod 17 is shown in its set position within slip tube 18 with roller 32 of bracket 27 in communication with recess 42 (not shown) of actuating rod 17 and contacts 24 and 28 closed. Electrical lead 46 is electrically connected to contact 24 and electrical lead 47 is electrically connected to one end of a solenoid winding (not shown) of solenoid 22 and electrical contact 28. Latch 49 is slideably carried within latch housing 37 and cooperates mechanically with shoulder 44 of latch recess 43 (FIG. 2). Solenoid 22 is shown in its de-energized position with latch bracket 34, spring biased to the position shown and solenoid rod 51 in its innermost position (when solenoid 22 is actuated, solenoid rod 51 moves to the left and out of solenoid).

Referring to FIG. 6, latch 49 is shown having a recess 55 with inner edge 54 for cooperation with shoulder 44 (FIG. 2) of latch recess 43 (FIG. 2).

Referring to FIG. 7, lock-out linkage 41 is rotatably attached by pin 53 to lock-out handle 54 and slideably received by bore 56 in set handle 39 and bore 57 in mounting plate 58. Mounting plate 58 is attached to handle 39 by screw 59. In the down position of lock-out handle 54, lock-out link 41 pulls bracket 61 to the position shown. Bracket 61 is rotatably attached to bracket 62 by pin 63 and carries lock-out bracket 64 to the position shown which holds latch 49 in its upward position with inner edge 54 out of range of shoulder 44 of latch recess 43.

Figure 8:
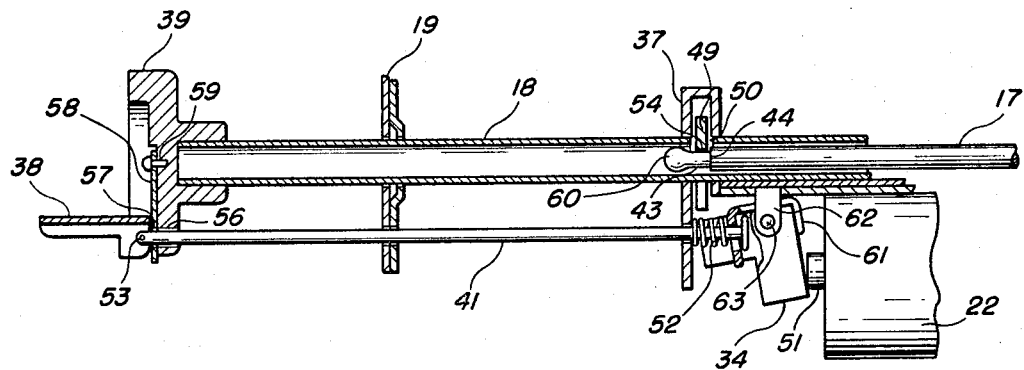
FIG. 8 is a side elevation in section of the invention in its set position.

Referring to FIG. 8, lock-out handle 54 is shown in the set position which allows latch 49 to drop to the position shown with inner edge 54 contacting shoulder 44 of latch recess 43.

*Operation*

Referring back to FIG. 1, when it is desired to set the mechanism to a given speed, the accelerator pedal 11 is first depressed to a position that will hold this speed. Lock-out handle 38 is in the position shown in FIGS. 1, 3, 4 and 8 which will allow latch 49 to drop through recess 50 of slip tube 18 when latch 43 of actuating rod 17 is in a cooperating position or relationship. This is accomplished by pushing in on set handle 39, pushing slip tube 18 until recess 50 and latch 49 are over the latch recess 43 of actuating rod 17. When this happens, latch 49 will drop into recess 43 by gravity and as the accelerator pedal attempts to lift up, shoulder 44 will prevent its upward travel since it is held by inner edge 54 of recess 53 in latch 49. Slip tube 18 will maintain its set position by its frictional engagement with bracket 19. This of course will not prevent the accelerator 11 from being depressed since shoulder 44 would then be traveling to the right or away from latch 49. If the accelerator pedal is depressed and let up slowly, the latch 49 will first be raised by end 60 of actuating rod 17 and then dropped down into recess 43 to restrain actuating rod 17 at shoulder 44 and the accelerator pedal will be maintained in the same position as it was originally set.

Electrical leads 46 and 47 (FIG. 3) are connected to the electrical system of the vehicle, one being connected to the brake light switch (the side going to the brake light) and the other being connected to the opposite side of the electrical power system. When the brake pedal is depressed, the brake light switch is thrown supplying power through electrical lead 46 (for example) contacts 24 and 28, and electrical lead 48 to one side of the solenoid winding (not shown) of solenoid 22, the other side being connected to electrical lead 47. At that time solenoid 22 will be actuated pushing center rod 51 to the left or out of the solenoid housing rotating bracket 34 and locking out or releasing latch 49, and with it actuating rod 17. Contacts 24 and 28 prevent the solenoid from being actuated unless roller 32 is depressed in recess 33 of slip tube 18 and recess 42 of actuating rod 17 cooperating with recess 33 of slip tube 18. This condition only exists when the system is in its set condition to prevent solenoid 22 from being actuated every time the brakes are depressed.

It can be further seen that if the system is in its set position and the accelerator pedal is depressed slightly and quickly released, the end 60 of actuating rod 17 will force latch 49 in its upward or released position and shoulder 44 will go past recess 50 of slip tube 18 before latch 49 can return. Latch 49 is not spring loaded but merely gravity biased.

The third method of releasing the mechanism and also locking out the mechanism is illustrated in FIGS. 7 and 8. Here FIG. 8 shows the set position with lock-out handle 54 horizontal and linkage 41 holding brackets 61 and 62 in the position shown. This allows latch 49 to drop to its position shown with shoulder 54 within latch recess 43 of actuating rod 17 (FIG. 2).

When it is desired to lock out the mechanism entirely, the lock-out handle 54 is rotated to the position shown in FIG. 7 pulling linkage 41 to the left and rotating brackets 61 and 64 to the position shown. This pushes latch 49 upward with inner edge 54 locked out of latching recess 43 of actuating rod 17 (FIG. 2) so that the system cannot be placed in its set condition. It can be seen that when lock-out handle 54 is rotated back to the position shown in FIG. 8 and the accelerator pedal depressed to its previously set position, it will automatically be re-set in the same position without further adjustment.

An accelerator set and release mechanism has been described which is simple and inexpensive to manufacture and install and incorporates safety features which obviate the possibility of the accelerator being set when it is undesirable or under emergency conditions.

It should be understood of course that the foregoing disclosure relates to only a preferred embodiment of the invention and that it is intended to cover all changes and modifications of the example of the invention herein chosen for the purposes of the disclosures which do not constitute departures from the spirit and scope of the invention.

I claim:
1. An accelerator set and release mechanism for setting an accelerator pedal to a predetermined position and releasing the pedal when desired comprising:
   a linkage having first and second ends, said first end being adapted for attachment to an accelerator pedal;
   a slip tube, said slip tube being frictionally and slideably attached to a fixture adapt for attachment in proximity to an accelerator pedal;
   a rod slideably carried within said slip tube, said rod being attached to said second end of said linkage;
   latching means mounted on said slip tube for latching said rod and said slip tube together in a predetermined axial relationship; and
   a hand actuated linkage mechanically coupled to said latching means for releasing said latching means.
2. The accelerator set and release mechanism of claim 1 and further including:
   a solenoid winding mounted in proximity to said latching means;
   a second linkage, said second linkage being mechanically coupled to said latching means and operable upon actuation to release said latch means; and
   said solenoid being operable for actuating said second linkage upon energization of said solenoid.
3. The accelerator set and release mechanism of claim 2 wherein said solenoid is adapted to be electrically connected for energization to a brake light switch.
4. The accelerator set and release mechanism of claim 1 wherein said latching means comprises:
   a latch slideably mounted upon top of said slip tube;
   a recess in said slip tube cooperating with said latch; and
   a shoulder in said rod for cooperating with said latch when said shoulder and said recess and said latch are all in vertical alignment.

References Cited

UNITED STATES PATENTS

| | | | |
|---|---|---|---|
| 2,765,058 | 10/1956 | Struthers | 192—3 |
| 2,936,866 | 5/1960 | Kelly | 74—531 X |
| 3,168,942 | 2/1965 | Thorner | 74—531 X |
| 3,224,292 | 12/1965 | Huber | 192—3 X |

OTHER REFERENCES

German printed application 1,164,249, February 1964.

BENJAMIN W. WYCHE III, *Primary Examiner.*